United States Patent
Adler et al.

(10) Patent No.: US 11,164,346 B2
(45) Date of Patent: *Nov. 2, 2021

(54) POSTERIOR IMAGE SAMPLING TO DETECT ERRORS IN MEDICAL IMAGING

(71) Applicant: Elekta AB (publ), Stockholm (SE)

(72) Inventors: Jonas Anders Adler, Stockholm (SE); Ozan Öktem, Sundbyberg (SE)

(73) Assignee: Elekta AB (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/929,940

(22) Filed: May 29, 2020

(65) Prior Publication Data

US 2020/0294284 A1    Sep. 17, 2020

Related U.S. Application Data

(63) Continuation of application No. 16/189,480, filed on Nov. 13, 2018, now Pat. No. 10,672,153.

(Continued)

(51) Int. Cl.
*G06T 11/00* (2006.01)
*G06T 7/10* (2017.01)

(52) U.S. Cl.
CPC .............. *G06T 11/008* (2013.01); *G06T 7/10* (2017.01); *G06T 2207/20076* (2013.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 6,606,615 B1 * | 8/2003 | Jennings | ................ | G06Q 10/06 706/45 |
| 7,689,016 B2 * | 3/2010 | Stoecker | ................ | G06T 7/155 382/128 |

(Continued)

FOREIGN PATENT DOCUMENTS

WO    WO-2019206917 A1    10/2019

OTHER PUBLICATIONS

Arridge et al. (Ozan, Oktem, "Recent Approaches for Using Machine Learning in Image Reconstruction", Oberwolfach Reports, Mini-Workshop: Deep Learning and Inverse Problems, (Mar. 4, 2018), 1-30, hereby referred to as "Arridge") (Year: 2018).*

(Continued)

*Primary Examiner* — Tahmina N Ansari
(74) *Attorney, Agent, or Firm* — Schwegman Lundberg & Woessner, P.A.; Sanjay Agrawal

(57) ABSTRACT

Image reconstruction can include using a statistical or machine learning, MAP estimator, or other reconstruction technique to produce a reconstructed image from acquired imaging data. A Conditional Generative Adversarial Network (CGAN) technique can be used to train a Generator, using a Discriminator, to generate posterior distribution sampled images that can be displayed or further processed such as to help provide uncertainty information about a mean reconstruction image. Such uncertainty information can be useful to help understand or even visually modify the mean reconstruction image. Similar techniques can be used in a segmentation use-case, instead of a reconstruction use case. The uncertainty information can also be useful for other post-processing techniques.

25 Claims, 6 Drawing Sheets

Related U.S. Application Data

(60) Provisional application No. 62/661,238, filed on Apr. 23, 2018.

(56) References Cited

U.S. PATENT DOCUMENTS

| | | | | |
|---|---|---|---|---|
| 7,840,042 | B2* | 11/2010 | Kriveshko | A61C 13/0022 382/128 |
| 8,571,278 | B2* | 10/2013 | Sonka | G06T 7/11 382/128 |
| 8,639,009 | B2* | 1/2014 | Lang | G06T 7/20 382/132 |
| 9,798,751 | B2* | 10/2017 | Birdwell | G06N 3/086 |
| 10,672,153 | B2 | 6/2020 | Adler et al. | |
| 2018/0060301 | A1* | 3/2018 | Li | G06N 3/08 |
| 2019/0325620 | A1 | 10/2019 | Adler et al. | |

OTHER PUBLICATIONS

"U.S. Appl. No. 16/189,480, Non Final Office Action dated Sep. 12, 2019", 26 pgs.

"U.S. Appl. No. 16/189,480, Notice of Allowance dated Jan. 28, 2020", 9 pgs.

"U.S. Appl. No. 16/189,480, Response filed Jan. 13, 2020 to Non Final Office Action dated Sep. 12, 2019", 11 pgs.

"Internatioanl Application Serial No. PCT/EP2019/060385, International Search Report dated Jun. 21, 2019", 4 pgs.

"International Application Serial No. PCT/EP2019/060385, Written Opinion dated Jun. 21, 2019", 5 pgs.

Jonas, Adler, et al., "Solving ill-posed inverse problems using iterative deep neural networks", Inverse Problems, Institute of Physics Publishing, Bristol, GB, vol. 33, No. 12, (Nov. 22, 2017).

Ozan, Oktem, "Recent Approaches for Using Machine Learning in Image Reconstruction", Oberwolfach Reports, Mini-Workshop: Deep Learning and Inverse Problems, (Mar. 4, 2018), 1-30.

* cited by examiner

FIG. 5A POSTERIOR SAMPLES (CLICK TO RUN)

FIG. 5B POSTERIOR SAMPLES (CLICK TO RUN)

FIG. 5C POSTERIOR SAMPLES (CLICK TO RUN)

POSTERIOR IMAGE SAMPLING TO DETECT ERRORS IN MEDICAL IMAGING

CLAIM FOR PRIORITY

This application is a continuation of U.S. application Ser. No. 16/189,480, filed Nov. 13, 2018, which claims the benefit of priority to U.S. Provisional Application Ser. No. 62/661,238, filed Apr. 23, 2018, both of which are hereby incorporated by reference in their entireties.

TECHNICAL FIELD

This document pertains generally, but not by way of limitation, to posterior image sampling using a statistical learning model, including, but not by way of limitation, for use in planning or administration of radiation treatment such as to a human or animal subject.

BACKGROUND

Radiation therapy can involve administering a dose of radiation to a human or animal subject. Careful planning can help ensure that the radiation reaches a target region of interest, while avoiding one or more nearby regions that are not expected to benefit from radiation and that may be impacted by side-effects of such radiation.

Three-dimensional (3D) imaging data can be used to characterize the internal structure of a specimen, such as a human patient, such as to help plan radiation treatment in such a patient, such as to treat a tumor. Such 3D imaging data can be obtained, for example, from a magnetic resonance (MR) or computed tomography (CT) imaging device or other imaging modality such as 3D electron microscopy. For example, the 3D CT imaging data can include voxels representing imaging data of various densities. For example, 3D CT voxel data of tissue within the subject will represent a higher density than voxels representing air outside of the subject. Voxels corresponding to air within a body cavity (e.g., within the bronchial tubes, for example, will also exhibit less density than surrounding tissue. Bone tissue voxels will have a higher density than softer tissue voxels. In another example, the 3D MR imaging data can include "k-space" values representing, in a spatial frequency domain, MR imaging data information.

Image "reconstruction" is an example of an "inverse problem" of generating structural information (e.g., an image of anatomical structures being studied) from acquired 3D CT imaging data or acquired 3D MR imaging data. The imaging data can be (and usually is) noisy, which can make it difficult to accurately reconstruct an exact image of the interior of a patient. Image "segmentation" refers to partitioning a reconstructed image into multiple regions, such as can permit locating of boundaries between structures in the reconstructed image.

SUMMARY

The present inventors have recognized, among other things, that image reconstruction can involve regularization of noisy acquired imaging data to produce a reconstructed image in which uncertainties in data can be inhibited from growing uncontrollably. For example, in CT image reconstruction, a Filtered Back-Projection image reconstruction technique can be used. A more generic, yet adaptable approach, can be based on reformulating the image reconstruction as an instance of Bayes inference, in which the goal is to recover the posterior distribution P (x|y), which represents the probability for the reconstructed image x given measured/acquired data y. The posterior distribution P (x|y) represents not only a single reconstructed image, it includes information about all possible reconstructed images, along with information about how likely such other possible reconstructed images are given the measured or acquired imaging data. Thus, the posterior distribution P (x|y) can provide a reconstructed image along with uncertainty quantification.

In imaging applications, like those in biomedical and medical imaging, the posterior distribution P (x|y) can be highly dimensional, because images can be described using a collection of many number values (e.g., one number value per pixel or voxel). For example, a 3D image in cone beam computed tomography (CBCT) can result in a $10^8$ dimensional array. Hence, recovering the entire 3D posterior distribution P (x|y) can be computationally intractable. An alternative to recovering the entire 3D posterior distribution P (x|y) is to explore the posterior distribution by computing some estimator. For example, one can explore the posterior distribution using a maximum a posterior (MAP) estimator, which can be defined as:

$$\arg\max_{x} P(x \mid y).$$

(Equation 1.) An iterative reconstruction approach can include explicitly or implicitly approximating a MAP estimator, given appropriate choices for the underlying probabilities. Alternatively, a machine learning reconstruction approach can be used, such as can be shown to approximate a "conditional expectation" estimator of the posterior distribution, which can be defined as:

$$\int x dP(x|y).$$

(Equation 2.) Regardless of which estimator is used for reconstruction, in general, typical reconstruction approaches will yield a single reconstructed image—which the present inventors have recognized can imply an enormous loss of important information. For example, all of the information contained in the posterior distribution P (x|y) related to quantifying the uncertainty associated with the reconstruction (using the estimator) may be lost by using only the single reconstructed image.

It is possible to quantify the point-wise (e.g., pixel-wise or voxel-wise for a given or otherwise temporally-consistent time) standard deviations in a given reconstructed image, but doing so would still only cover a miniscule portion of the posterior distribution. Moreover, such a point-wise approach misses any (possibly non-linear) causalities between image features. More precisely, point-wise standard deviation can give point-wise bounds in the reconstructed image, but such an approach cannot compute the probability of a tumor actually being there or whether an antibody has bound to an antigen. The latter can involve many pixels with possibly complicated casual relations that are not captured by only considering point-wise standard deviations in the reconstructed image.

The present inventors have recognized that a more complete analysis of the uncertainties can be obtained using a sampling from the posterior distribution. Such an approach can allow one to query the probability of the likelihood of a certain image feature, but such an approach can present at least two disadvantages for biomedical and medical imaging applications. First, it involves using a closed form of the posterior distribution P(x|y), which is typically not available except in very simplified cases. Second, sampling from the posterior distribution is generally based on designing structured random walks in high-dimensional spaces, such as for example using Markov Chain Monte Carlo (MCMC) techniques, which can be very slow even when highly optimized. The present techniques can help address both of these two potential problems.

The present techniques can include using one or more generative models in statistical or machine learning, such as can be combined with other one or more other techniques in statistical or machine learning for solving inverse problems (such as image reconstruction), such as to create a neural network that can allow quick or efficient sampling from the posterior distribution, such as can be useful to assess uncertainty associated with the reconstructed image.

As explained further herein, the present techniques can be implemented using a generative model that can be conditioned on some input, e.g., using a Conditional Variational Auto-Encoder (CVAE) or a Conditional Generative Adversarial Network (CGAN). For illustrative clarity, the explanation given below in the Detailed Description of this patent document emphasizes a CGAN approach, however, the present techniques are not so limited.

The above is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 5A, 5B, 5C, and 5D illustrate examples of how the posterior distribution simulated images can be used to assess uncertainty information associated with the mean reconstructed image.

DETAILED DESCRIPTION

Image reconstruction can include using a statistical or machine learning, MAP estimator, or other reconstruction technique to produce a reconstructed image from acquired imaging data. A Conditional Generative Adversarial Network (CGAN) technique can be used to train a Generator, using a Discriminator, to generate posterior distribution sampled images that can be displayed or further processed such as to help provide uncertainty information about a mean reconstruction image. Such uncertainty information can be useful to help understand or even visually modify the mean reconstruction image. Similar techniques can be used in a segmentation use-case, instead of a reconstruction use case. The uncertainty information can also be useful for other post-processing techniques.

Figure 1:
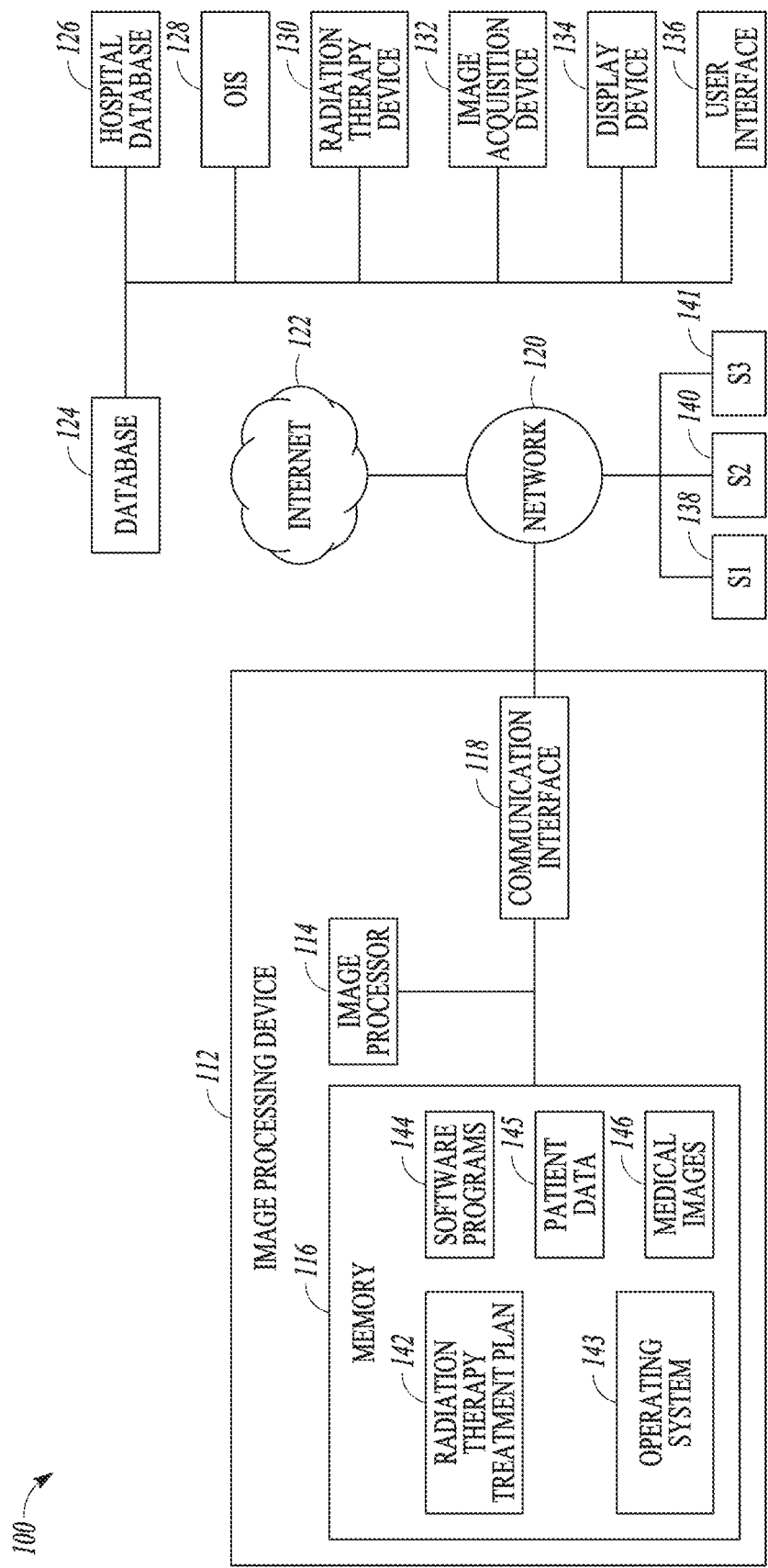
FIG. 1 illustrates an example of a radiotherapy system.

FIG. 1 illustrates an exemplary radiotherapy system 100 for providing radiation therapy to a patient, to a portion of a patient, or to a "phantom", which can include a target object representing the patient or the portion of the patient. The radiotherapy system 100 includes an image processing device, 112. The image processing device 112 may be connected to a network 120. The network 120 may be connected to the Internet 122. The network 120 can connect the image processing device 112 with one or more of a database 124, a hospital database 126, an oncology information system (OIS) 128, a radiation therapy device 130, an image acquisition device 132, a display device 134, and a user interface 136. The image processing device 112 can be configured to generate radiation therapy treatment plans 142 to be used by the radiation therapy device 130.

The image processing device 112 may include a memory device 116, a processor 114 and a communication interface 118. The memory device 116 may store computer-executable instructions, such as an operating system 143, a radiation therapy treatment plans 142. (e.g., original treatment plans, adapted treatment plans and the like), software programs 144 (e.g., artificial intelligence, deep learning, neural networks, radiotherapy treatment plan software), and any other computer-executable instructions to be executed by the processor 114. In one embodiment, the software programs 144 may convert medical images of one format (e.g., MRI) to another format (e.g., CT) by producing synthetic images, such as a pseudo-CT image. For instance, the software programs 144 may include image processing programs to train a predictive model for converting a medial image 146 in one modality (MRI image) into a synthetic image of a different modality (e.g., a pseudo CT image); alternatively, the trained predictive model may convert a CT image into an MRI image. In another embodiment, the software programs 144 may register the patient image (e.g., a CT image or an MR image) with that patient's dose distribution (also represented as an image) so that corresponding image voxels and dose voxels are associated appropriately by the network. In yet another embodiment, the software programs 144 may substitute functions of the patient images such as signed distance functions or processed versions of the images that emphasize some aspect of the image information. Such functions might emphasize edges or differences in voxel textures, or any other structural aspect useful to neural network learning. In another embodiment, the software programs 144 may substitute functions of the dose distribution that emphasize some aspect of the dose information. Such functions might emphasize steep gradients around the target, or any other structural aspect useful to neural network learning. The memory device 116 may store data, including medical images 146, patient data 145, and other data required to create and implement a radiation therapy treatment plan 142.

In addition to the memory 116 storing the software programs 144, it is contemplated that software programs 144 may be stored on a removable computer medium, such as a hard drive, a computer disk, a CD-ROM, a DVD, a HD, a Blu-Ray DVD, USB flash drive, a SD card, a memory stick, or any other suitable medium; and the software programs 144 when downloaded to image processing device 112 may be executed by image processor 114.

The processor 114 may be communicatively coupled to the memory device 116, and the processor 114 may be configured to execute computer executable instructions stored thereon. The processor 114 may send or receive medical images 146 to memory 116. For example, the processor 114 may receive medical images 146 from the image acquisition device 132 via the communication interface 118 and network 120 to be stored in memory 116. The processor 114 may also send medical images 146 stored in memory 116 via the communication interface 118 to the network 120 be either stored in database 124 or the hospital database 126.

Further, the processor 114 may utilize software programs 144 (e.g., a treatment planning software) along with the medical images 146 and patient data 145 to create the radiation therapy treatment plan 142. Medical images 146 may include information such as imaging data associated with a patient anatomical region, organ, or volume of interest segmentation data. Patient data 145 may include information such as (1) functional organ modeling data (e.g., serial versus parallel organs, appropriate dose response models, etc.); (2) radiation dosage data (e.g., dose-volume histogram (DVH) information; or (3) other clinical information about the patient and course of treatment (e.g., other surgeries, chemotherapy, previous radiotherapy, etc.).

In addition, the processor 114 may utilize software programs to generate intermediate data such as updated parameters to be used, for example, by a neural network model; or generate intermediate 2D or 3D images, which may then subsequently be stored in memory 116. The processor 114 may subsequently then transmit the executable radiation therapy treatment plan 142 via the communication interface 118 to the network 120 to the radiation therapy device 130, where the radiation therapy plan will be used to treat a patient with radiation. In addition, the processor 114 may execute software programs 144 to implement functions such as image conversion, image segmentation, deep learning, neural networks, and artificial intelligence. For instance, the processor 114 may execute software programs 144 that train or contour a medical image; such software 144 when executed may train a boundary detector, or utilize a shape dictionary.

The processor 114 may be a processing device, include one or more general-purpose processing devices such as a microprocessor, a central processing unit (CPU), a graphics processing unit (GPU), an accelerated processing unit (APU), or the like. More particularly, the processor 114 may be a complex instruction set computing (CISC) microprocessor, a reduced instruction set computing (RISC) microprocessor, a very long instruction Word (VLIW) microprocessor, a processor implementing other instruction sets, or processors implementing a combination of instruction sets. The processor 114 may also be implemented by one or more special-purpose processing devices such as an application specific integrated circuit (ASIC), a field programmable gate array (FPGA), a digital signal processor (DSP), a System on a Chip (SoC), or the like. As would be appreciated by those skilled in the art, in some embodiments, the processor 114 may be a special-purpose processor, rather than a general-purpose processor. The processor 114 may include one or more known processing devices, such as a microprocessor from the Pentium™, Core™, Xeon™, or Itanium® family manufactured by Intel™, the Turion™, Athlon™, Sempron™, Opteron™, FX™, Phenom™ family manufactured by AMD™, or any of various processors manufactured by Sun Microsystems. The processor 114 may also include graphical processing units such as a GPU from the GeForce®, Quadro®, Tesla® family manufactured by Nvidia™, GMA, Iris™ family manufactured by Intel™, or the Radeon™ family manufactured by AMD™. The processor 114 may also include accelerated processing units such as the Xeon Phi™ family manufactured by Intel™. The disclosed embodiments are not limited to any type of processor(s) otherwise configured to meet the computing demands of identifying, analyzing, maintaining, generating, and/or providing large amounts of data or manipulating such data to perform the methods disclosed herein. In addition, the term "processor" may include more than one processor, for example, a multi-core design or a plurality of processors each having a multi-core design. The processor 114 can execute sequences of computer program instructions, stored in memory 116, to perform various operations, processes, methods that will be explained in greater detail below.

The memory device 116 can store medical images 146. In some embodiments, the medical images 146 may include one or more MRI image (e.g., 2D MRI, 3D MRI, 2D streaming MRI, 4D MRI, 4D volumetric MRI, 4D cine MRI, etc.), functional MRI images (e.g., fMRI, DCE-MRI, diffusion MRI), Computed Tomography (CT) images (e.g., 2D CT, Cone beam CT, 3D CT, 4D CT), ultrasound images (e.g., 2D ultrasound, 3D ultrasound, 4D ultrasound), Positron Emission Tomography (PET) images, X-ray images, fluoroscopic images, radiotherapy portal images, Single-Photo Emission Computed Tomography (SPECT) images, computer generated synthetic images (e.g., pseudo-CT images) and the like. Further, the medical images 146 may also include medical image data, for instance, training images, and ground truth images, contoured images, and dose images. In an embodiment, the medical images 146 may be received from the image acquisition device 132. Accordingly, image acquisition device 132 may include a MRI imaging device, a CT imaging device, a PET imaging device, an ultrasound imaging device, a fluoroscopic device, a SPECT imaging device, an integrated Linear Accelerator and MRI imaging device, or other medical imaging devices for obtaining the medical images of the patient. The medical images 146 may be received and stored in any type of data or any type of format that the image processing device 112 may use to perform operations consistent with the disclosed embodiments. The memory device 116 may be a non-transitory computer-readable medium, such as a read-only memory (ROM), a phase-change random access memory (PRAM), a static random access memory (SRAM), a flash memory, a random access memory (RAM), a dynamic random access memory (DRAM) such as synchronous DRAM (SDRAM), an electrically erasable programmable read-only memory (EEPROM), a static memory (e.g., flash memory, flash disk, static random access memory) as well as other types of random access memories, a cache, a register, a compact disc read-only memory (CD-ROM), a digital versatile disc (DVD) or other optical storage, a cassette tape, other magnetic storage device, or any other non-transitory medium that may be used to store information including image, data, or computer executable instructions (e.g., stored in any format) capable of being accessed by the processor 114, or any other type of computer device. The computer program instructions can be accessed by the processor 114, read from the ROM, or any other suitable memory location, and loaded into the RAM for execution by the processor 114. For example, the memory 116 may store one or more software applications. Software applications stored in the memory 116 may include, for example, an operating system 143 for common computer systems as well as for software-controlled devices. Further, the memory 116 may store an entire software application, or only a part of a software application, that are executable by the processor 114. For example, the memory device 116 may store one or more radiation therapy treatment plans 142.

The image processing device 112 can communicate with the network 120 via the communication interface 118, which can be communicatively coupled to the processor 114 and the memory 116. The Communication interface 118 may provide communication connections between the image processing device 112 and radiotherapy system 100 components (e.g., permitting the exchange of data with external devices). For instance, the communication interface 118 may in some embodiments have appropriate interfacing circuitry to connect to the user interface 136, which may be a hardware keyboard, a keypad, or a touch screen through which a user may input information into radiotherapy system 100.

Communication interface 118 may include, for example, a network adaptor, a cable connector, a serial connector, a USB connector, a parallel connector, a high-speed data transmission adaptor (e.g., such as fiber, USB 3.0, thunderbolt, and the like), a wireless network adaptor (e.g., such as a WiFi adaptor), a telecommunication adaptor (e.g., 3G, 4G/LTE and the like), and the like. Communication interface 118 may include one or more digital and/or analog communication devices that permit image processing device 112 to communicate with other machines and devices, such as remotely located components, via the network 120.

The network 120 may provide the functionality of a local area network (LAN), a wireless network, a cloud computing environment (e.g., software as a service, platform as a service, infrastructure as a service, etc.), a client-server, a wide area network (WAN), and the like. For example, network 120 may be a LAN or a WAN that may include other systems S1 (138), S2 (140), and S3 (141). Systems S1, S2, and S3 may be identical to image processing device 112 or may be different systems. In some embodiments, one or more of systems in network 120 may form a distributed computing/simulation environment that collaboratively performs the embodiments described herein. In some embodiments, one or more systems S1, S2, and S3 may include a CT scanner that obtain CT images (e.g., medical images 146). In addition, network 120 may be connected to internet 122 to communicate with servers and clients that reside remotely on the internet.

Therefore, network 120 can allow data transmission between the image processing device 112 and a number of various other systems and devices, such as the OIS 128, the radiation therapy device 130, and the image acquisition device 132. Further, data generated by the OIS 128 and/or the image acquisition device 132 may be stored in the memory 116, the database 124, and/or the hospital database 126. The data may be transmitted/received via network 120, through communication interface 118 in order to be accessed by the processor 114, as required.

The image processing device 112 may communicate with database 124 through network 120 to send/receive a plurality of various types of data stored on database 124. For example, database 124 may include machine data that is information associated with a radiation therapy device 130, image acquisition device 132, or other machines relevant to radiotherapy. Machine data information may include radiation beam size, arc placement, beam on and off time duration, machine parameters, segments, multi-leaf collimator (MLC) configuration, gantry speed, MRI pulse sequence, and the like. Database 124 may be a storage device and may be equipped with appropriate database administration software programs. One skilled in the art would appreciate that database 124 may include a plurality of devices located either in a central or a distributed manner.

In some embodiments, database 124 may include a processor-readable storage medium (not shown). While the processor-readable storage medium in an embodiment may be a single medium, the term "processor-readable storage medium" should be taken to include a single medium or multiple media (e.g., a centralized or distributed database, and/or associated caches and servers) that store the one or more sets of computer executable instructions or data. The term "processor-readable storage medium" shall also be taken to include any medium that is capable of storing or encoding a set of instructions for execution by a processor and that cause the processor to perform any one or more of the methodologies of the present disclosure. The term "processor readable storage medium" shall accordingly be taken to include, but not be limited to, solid-state memories, optical and magnetic media. For example, the processor readable storage medium can be one or more volatile, non-transitory, or non-volatile tangible computer-readable media.

Image processor 114 may communicate with database 124 to read images into memory 116 or store images from memory 116 to database 124. For example, the database 124 may be configured to store a plurality of images (e.g., 3D MRI, 4D MRI, 2D MRI slice images, CT images, 2D Fluoroscopy images, X-ray images, raw data from MR scans or CT scans, Digital Imaging and Communications in Medicine (DICOM) data, etc.) that the database 124 received from image acquisition device 132. Database 124 may store data to be used by the image processor 114 when executing software program 144, or when creating radiation therapy treatment plans 142. Database 124 may store the data produced by the trained neural network including the network parameters constituting the model learned by the network and the resulting predicted data. The image processing device 112 may receive the imaging data 146 (e.g., 2D MRI slice images, CT images, 2D Fluoroscopy images, X-ray images, 3DMRI images, 4D MRI images, etc.) either from the database 124, the radiation therapy device 130 (e.g., a MRI-Linac), and or the image acquisition device 132 to generate a treatment plan 142.

In an embodiment, the radiotherapy system 100 can include an image acquisition device 132 that can acquire medical images (e.g., Magnetic Resonance Imaging (MRI) images, 3D MRI, 2D streaming MRI, 4D volumetric MRI, Computed Tomography (CT) images, Cone-Beam CT, Positron Emission Tomography (PET) images, functional MRI images (e.g., fMRI, DCE-MRI and diffusion MRI), X-ray images, fluoroscopic image, ultrasound images, radiotherapy portal images, single-photo emission computed tomography (SPECT) images, and the like) of the patient. Image acquisition device 132 may, for example, be an MRI imaging device, a CT imaging device, a PET imaging device, an ultrasound device, a fluoroscopic device, a SPECT imaging device, or any other suitable medical imaging device for obtaining one or more medical images of the patient. Images acquired by the imaging acquisition device 132 can be stored within database 124 as either imaging data and/or test data. By way of example, the images acquired by the imaging acquisition device 132 can be also stored by the image processing device 112, as medical image data 146 in memory 116.

In an embodiment, for example, the image acquisition device 132 may be integrated with the radiation therapy device 130 as a single apparatus (e.g., a MRI device combined with a linear accelerator, also referred to as an "MRI-Linac." Such an MRI-Linac can be used, for example, to determine a location of a target organ or a target tumor in the patient, so as to direct radiation therapy accurately according to the radiation therapy treatment plan 142 to a predetermined target.

The image acquisition device 132 can be configured to acquire one or more images of the patient's anatomy for a region of interest (e.g., a target organ, a target tumor or both). Each image, typically a 2D image or slice, can include one or more parameters (e.g., a 2D slice thickness, an orientation, and a location, etc.). In an embodiment, the image acquisition device 132 can acquire a 2D slice in any orientation. For example, an orientation of the 2D slice can include a sagittal orientation, a coronal orientation, or an axial orientation. The processor 114 can adjust one or more parameters, such as the thickness and/or orientation of the 2D slice, to include the target organ and/or target tumor. In an embodiment, 2D slices can be determined from information such as a 3D MRI volume. Such 2D slices can be acquired by the image acquisition device 132 in "near real-time" while a patient is undergoing radiation therapy treatment, for example, when using the radiation therapy device 130. "Near real-time" meaning acquiring the data in at least milliseconds or less.

The image processing device 112 may generate and store radiation therapy treatment plans 142 for one or more patients. The radiation therapy treatment plans 142 may provide information about a particular radiation dose to be applied to each patient. The radiation therapy treatment plans 142 may also include other radiotherapy information, such as beam angles, dose-histogram-volume information, the number of radiation beams to be used during therapy, the dose per beam, and the like.

The image processor 114 may generate the radiation therapy treatment plan 142 by using software programs 144 such as treatment planning software, such as Monaco®, manufactured by Elekta AB of Stockholm, Sweden. In order to generate the radiation therapy treatment plans 142, the image processor 114 may communicate with the image acquisition device 132 (e.g., a CT device, a MRI device, a PET device, an X-ray device, an ultrasound device, etc.) to access images of the patient and to delineate a target, such as a tumor. In some embodiments, the delineation of one or more organs at risk (OARs), such as healthy tissue surrounding the tumor or in close proximity to the tumor may be required. Therefore, segmentation of the OAR may be performed when the OAR is close to the target tumor. In addition, if the target tumor is close to the OAR (e.g., prostate in near proximity to the bladder and rectum), then by segmenting the OAR from the tumor, the radiotherapy system 100 may study the dose distribution not only in the target, but also in the OAR.

In order to delineate a target organ or a target tumor from the OAR, medical images, such as MRI images, CT images, PET images, fMRI images, X-ray images, ultrasound images, radiotherapy portal images, SPECT images and the like, of the patient undergoing radiotherapy may be obtained non-invasively by the image acquisition device 132 to reveal the internal structure of a body part. Based on the information from the medical images, a 3D structure of the relevant anatomical portion may be obtained. In addition, during a treatment planning process, many parameters may be taken into consideration to achieve a balance between efficient treatment of the target tumor (e.g., such that the target tumor receives enough radiation dose for an effective therapy) and low irradiation of the OAR(s) (e.g., the OAR(s) receives as low a radiation dose as possible). Other parameters that may be considered include the location of the target organ and the target tumor, the location of the OAR, and the movement of the target in relation to the OAR. For example, the 3D structure may be obtained by contouring the target or contouring the OAR within each 2D layer or slice of an MRI or CT image and combining the contour of each 2D layer or slice. The contour may be generated manually (e.g., by a physician, dosimetrist, or health care worker using a program such as MONACO™ manufactured by Elekta AB of Stockholm, Sweden) or automatically (e.g., using a program such as the Atlas-based auto-segmentation software, ABAS™, manufactured by Elekta AB of Stockholm, Sweden). In certain embodiments, the 3D structure of a target tumor or an OAR may be generated automatically by the treatment planning software.

After the target tumor and the OAR(s) have been located and delineated, a dosimetrist, physician or healthcare worker may determine a dose of radiation to be applied to the target tumor, as well as any maximum amounts of dose that may be received by the OAR proximate to the tumor (e.g., left and right parotid, optic nerves, eyes, lens, inner ears, spinal cord, brain stem, and the like). After the radiation dose is determined for each anatomical structure (e.g., target tumor, OAR), a process known as inverse planning may be performed to determine one or more treatment plan parameters that would achieve the desired radiation dose distribution. Examples of treatment plan parameters include volume delineation parameters (e.g., which define target volumes, contour sensitive structures, etc.), margins around the target tumor and OARs, beam angle selection, collimator settings, and beam-on times. During the inverse-planning process, the physician may define dose constraint parameters that set bounds on how much radiation an OAR may receive (e.g., defining full dose to the tumor target and zero dose to any OAR; defining 95% of dose to the target tumor; defining that the spinal cord, brain stem, and optic structures receive ≤45Gy, ≤55Gy and <54Gy, respectively). The result of inverse planning may constitute a radiation therapy treatment plan 142 that may be stored in memory 116 or database 124. Some of these treatment parameters may be correlated. For example, tuning one parameter (e.g., weights for different objectives, such as increasing the dose to the target tumor) in an attempt to change the treatment plan may affect at least one other parameter, which in turn may result in the development of a different treatment plan. Thus, the image processing device 112 can generate a tailored radiation therapy treatment plan 142 having these parameters in order for the radiation therapy device 130 to provide radiotherapy treatment to the patient.

In addition, the radiotherapy system 100 may include a display device 134 and a user interface 136. The display device 134 may include one or more display screens that display medical images, interface information, treatment planning parameters (e.g., contours, dosages, beam angles, etc.) treatment plans, a target, localizing a target and/or tracking a target, or any related information to the user. The user interface 136 may be a keyboard, a keypad, a touch screen or any type of device that a user may input information to radiotherapy system 100. Alternatively, the display device 134 and the user interface 136 may be integrated into a device such as a tablet computer, e.g., Apple iPad®, Lenovo Thinkpad®, Samsung Galaxy®, etc.

Furthermore, any and all components of the radiotherapy system 100 may be implemented as a virtual machine (e.g., VMWare, Hyper-V, and the like). For instance, a virtual machine can be software that functions as hardware. Therefore, a virtual machine can include at least one or more virtual processors, one or more virtual memories, and one or more virtual communication interfaces that together function as hardware. For example, the image processing device 112, the OIS 128, the image acquisition device 132 could be implemented as a virtual machine. Given the processing power, memory, and computational capability available, the entire radiotherapy system 100 could be implemented as a virtual machine.

Figure 2:
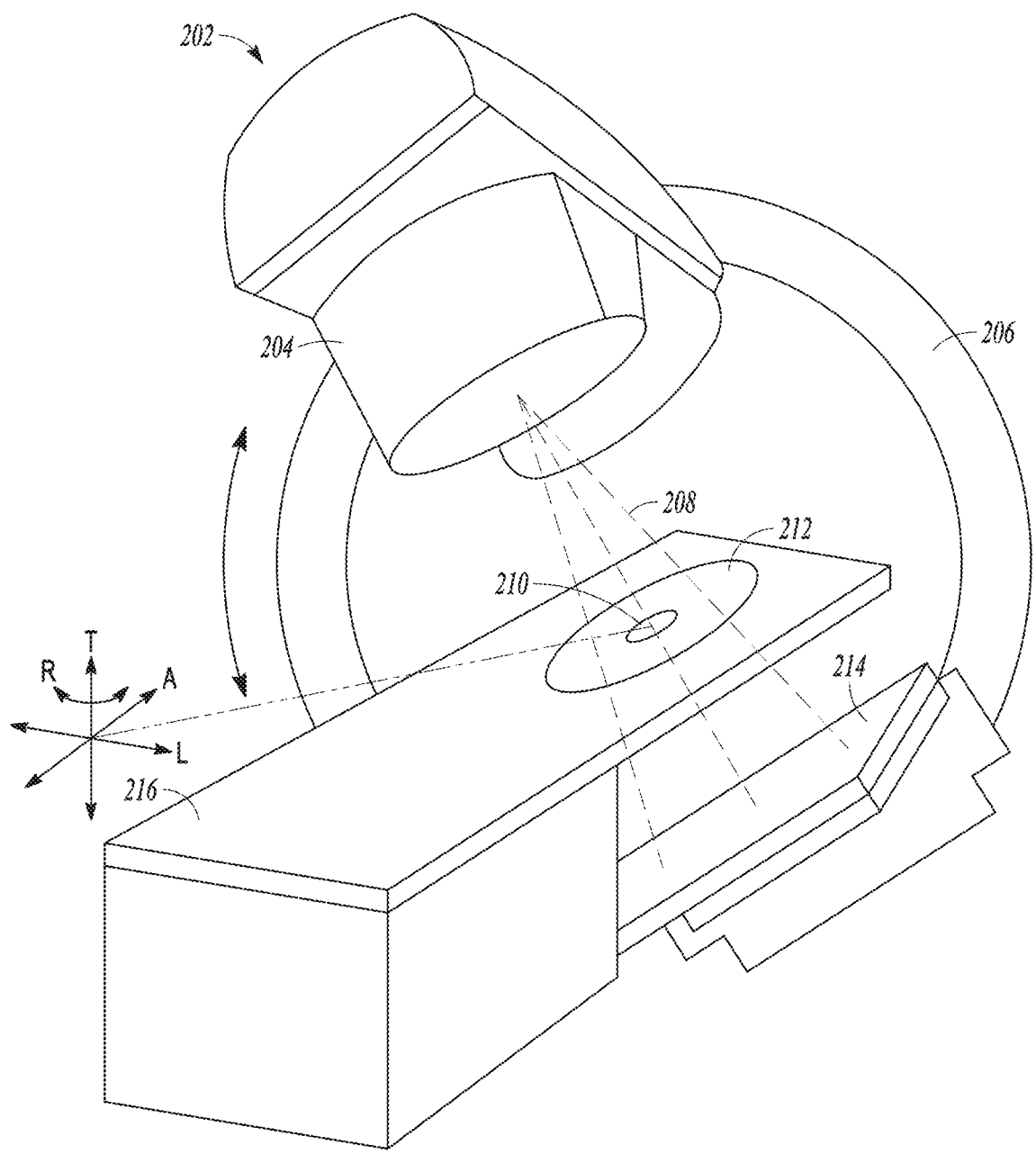
FIG. 2 illustrates an example of a radiation therapy system that can include radiation therapy output configured to provide a therapy beam.

FIG. 2 illustrates an exemplary radiation therapy device 202 that may include a radiation source, such as an X-ray source or a linear accelerator, a couch 216, an imaging detector 214, and a radiation therapy output 204. The radiation therapy device 202 may be configured to emit a radiation beam 208 to provide therapy to a patient. The radiation therapy output 204 can include one or more attenuators or collimators, such as a multi-leaf collimator (MLC).

In FIG. 2, a patient can be positioned in a region 212, supported by the treatment couch 216 to receive a radiation therapy dose according to a radiation therapy treatment plan. The radiation therapy output 204 can be mounted or attached to a gantry 206 or other mechanical support. One or more chassis motors (not shown) may rotate the gantry 206 and the radiation therapy output 204 around couch 216 when the couch 216 is inserted into the treatment area. In an embodiment, gantry 206 may be continuously rotatable around couch 216 when the couch 216 is inserted into the treatment area. In another embodiment, gantry 206 may rotate to a predetermined position when the couch 216 is inserted into the treatment area. For example, the gantry 206 can be configured to rotate the therapy output 204 around an axis ("A"). Both the couch 216 and the radiation therapy output 204 can be independently moveable to other positions around the patient, such as moveable in transverse direction ("T"), moveable in a lateral direction ("L"), or as rotation about one or more other axes, such as rotation about a transverse axis (indicated as "R"). A controller communicatively connected to one or more actuators (not shown) may control the couch 216 movements or rotations in order to properly position the patient in or out of the radiation beam 208 according to a radiation therapy treatment plan. As both the couch 216 and the gantry 206 are independently moveable from one another in multiple degrees of freedom, which allows the patient to be positioned such that the radiation beam 208 precisely can target the tumor.

The coordinate system (including axes A, T, and L) shown in FIG. 2 can have an origin located at an isocenter 210. The isocenter can be defined as a location where the central axis of the radiation therapy beam 208 intersects the origin of a coordinate axis, such as to deliver a prescribed radiation dose to a location on or within a patient. Alternatively, the isocenter 210 can be defined as a location where the central axis of the radiation therapy beam 208 intersects the patient for various rotational positions of the radiation therapy output 204 as positioned by the gantry 206 around the axis A.

Gantry 206 may also have an attached imaging detector 214. The imaging detector 214 preferably located opposite to the radiation source 204, and in an embodiment, the imaging detector 214 can be located within a field of the therapy beam 208.

The imaging detector 214 can be mounted on the gantry 206 preferably opposite the radiation therapy output 204, such as to maintain alignment with the therapy beam 208. The imaging detector 214 rotating about the rotational axis as the gantry 206 rotates. In an embodiment, the imaging detector 214 can be a flat panel detector (e.g., a direct detector or a scintillator detector). In this manner, the imaging detector 214 can be used to monitor the therapy beam 208 or the imaging detector 214 can be used for imaging the patient's anatomy, such as portal imaging. The control circuitry of radiotherapy device 202 may be integrated within system 100 or remote from it.

In an illustrative embodiment, one or more of the couch 216, the therapy output 204, or the gantry 206 can be automatically positioned, and the therapy output 204 can establish the therapy beam 208 according to a specified dose for a particular therapy delivery instance. A sequence of therapy deliveries can be specified according to a radiation therapy treatment plan, such as using one or more different orientations or locations of the gantry 206, couch 216, or therapy output 204. The therapy deliveries can occur sequentially, but can intersect in a desired therapy locus on or within the patient, such as at the isocenter 210. A prescribed cumulative dose of radiation therapy can thereby be delivered to the therapy locus while damage to tissue nearby the therapy locus can be reduced or avoided.

FIG. 2 illustrates generally illustrate an embodiment of a radiation therapy device configured to provide radiotherapy treatment to a patient, including a configuration where a radiation therapy output can be rotated around a central axis an axis "A"). Other radiation therapy output configurations can be used. For example, a radiation therapy output can be mounted to a robotic arm or manipulator having multiple degrees of freedom. In yet another embodiment, the therapy output can be fixed, such as located in a region laterally separated from the patient, and a platform supporting the patient can be used to align a radiation therapy isocenter with a specified target locus within the patient.

In another embodiment, a radiation therapy device can be a combination of a linear accelerator and an image acquisition device, in some embodiments, the image acquisition device may be an MRI, an X-ray, a CT, a CBCT, a spiral CT, a PET, a SPECT, an optical tomography, a fluorescence imaging, ultrasound imaging, or radiotherapy portal imaging device, etc., as would be recognized by one of ordinary skill in the art.

Techniques to Apply a Statistical Learning Model for Posterior Sampling of an Image The present inventors have recognized, among other things, a need to help improve image reconstruction or image segmentation, such as by using a statistical or machine learning technique for sampling a posterior distribution such as for providing uncertainty information associated with a reconstructed image.

Figure 3:
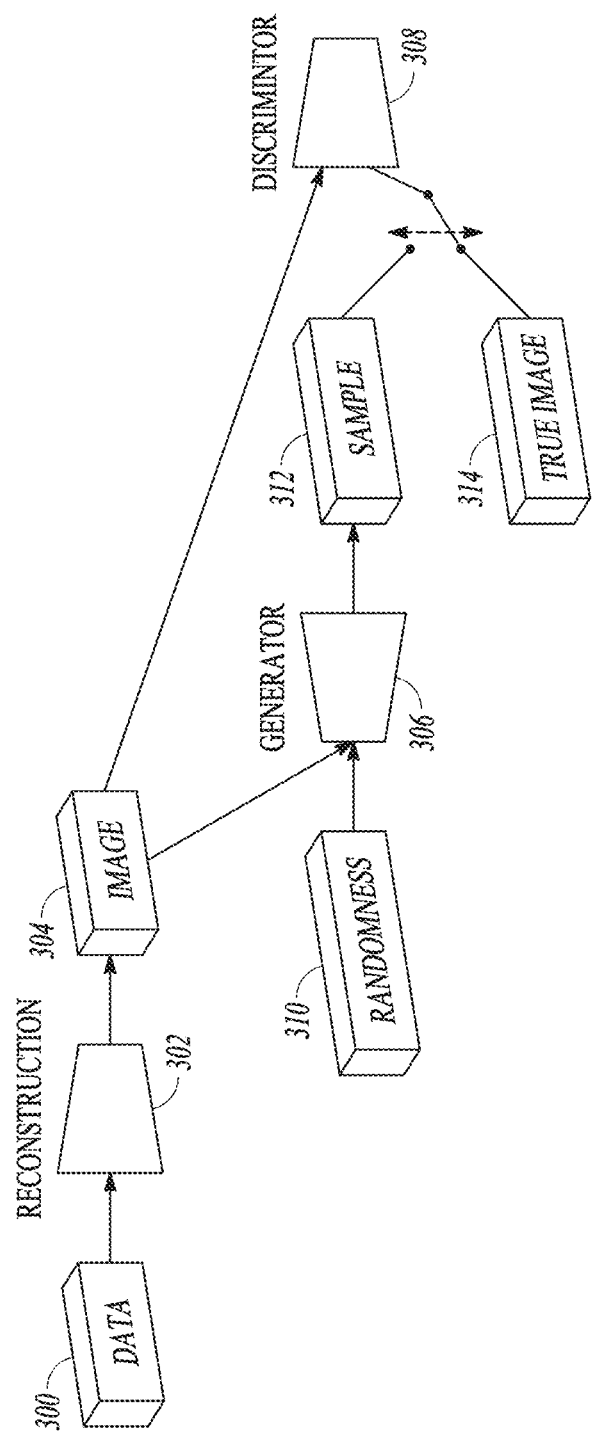
FIG. 3 illustrates an example of using a statistical or machine learning technique for sampling a posterior distribution such as for providing uncertainty information associated with a reconstructed image, such as can be implemented at least in part using a device or machine such as shown in FIG. 6.
Figure 6:
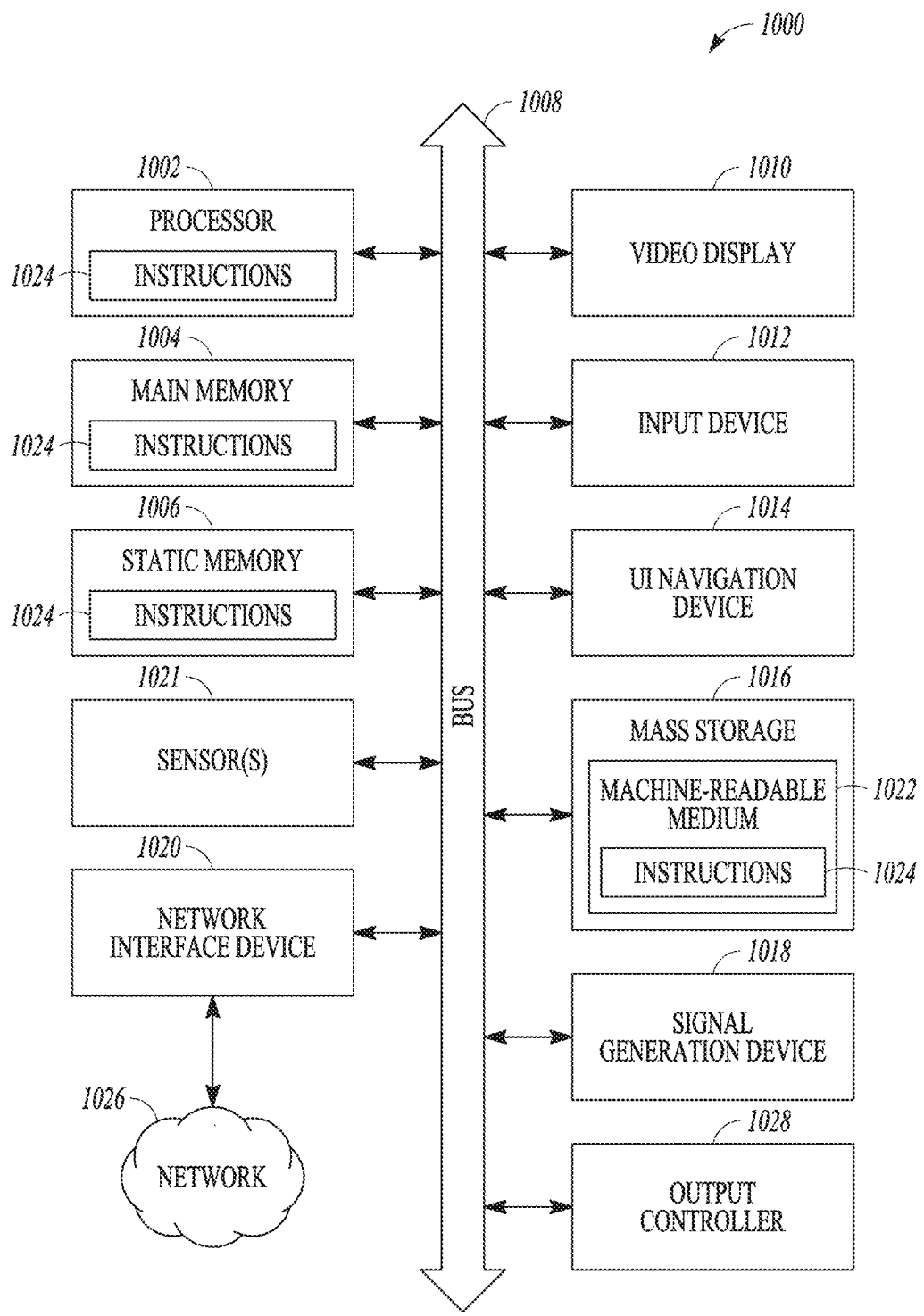
FIG. 6 illustrates a block diagram of an embodiment of a device or machine on which one or more of the methods as discussed herein can be implemented, such as for using a statistical or machine learning technique for sampling a posterior distribution such as for providing uncertainty information associated with a reconstructed image.

FIG. 3 illustrates an example of using a statistical or machine learning technique for sampling a posterior distribution such as for providing uncertainty information associated with a reconstructed image, such as can be implemented using image processor circuitry or at least in part using a device or machine such as shown in FIG. 6. FIG. 3 illustrates aspects of both training a statistical or machine learning model and using such a trained model at run-time such as for sampling a posterior distribution such as for providing uncertainty information associated with a reconstructed image. First model training will be described with respect to FIG. 3, then use of the trained-model at run-time for providing uncertainty information about a reconstructed image will be described further with respect to FIG. 4.

At 300, measured or acquired imaging data of an object can be received or otherwise obtained. Such imaging data of the imaged object may have been previously acquired by an imaging modality (e.g., CT, MR, or other imaging modality), and then stored, such as in memory circuitry that can be included within or communicatively accessible by the image processor circuitry.

At 302, an initial image reconstruction can be performed upon the imaging data obtained at 300. In an example, the initial image reconstruction can use a technique that can yield an approximation to the conditional mean (e.g., such as using an approach based on statistical or machine learning, or by using a MAP estimator or the like). This initial reconstructed image 304 can be referred to as an "initial image" or as "the mean image."

At 304, the initial image can be fed to a Generator 306 convolutional network of a Conditional Generative Adversarial Network (CGAN) that also includes a Discriminator 308 convolutional network. In this document, the term "convolutional" is understood to include the possibility of "deconvolutional." For example, the Generator 306 and the Discriminator 308 can form an adversarial network architecture in which the Discriminator 308 can be adjusted during training such as to enhance or maximize a value of an objective over a distribution of inputs to the Discriminator 308, and the Generator 306 convolutional network can be adjusted during training to reduce or minimize the value of the objective over a distribution of inputs to the Generator 306.

An independent noise source at 310 (e.g., normally distributed random values) can be fed, together with the initial image at 304, to the Generator 306. The Generator 306 can use a statistical learning model represented by its convolutional network to combine the random noise values at 310 with the initial image at 304. The resulting output from the Generator 306 can include one or multiple posterior distribution simulated images 312 (which can also be referred to as posterior distribution sampled images, or even more simply as "samples" from the posterior distribution P(x|y)). These posterior distribution simulated images at 312 can be used at run-time to provide information about the uncertainty associated with the initial image 304, such as explained further herein.

During CGAN training of the Generator 306, the Discriminator 308 also receives the initial image at 304. During training, the Generator generates, from the initial image at 304 and the random noise values at 310, posterior distribution simulated images at 312, which is conditioned on the initial image at 304 provided to the Discriminator 308. During training, these posterior distribution simulated images at 312 can be provided to the Discriminator 308. Also during training, a corresponding deemed true image 314 (e.g., corresponding to the initial image at 304) of the object is also provided to the Discriminator 308. During training, the Discriminator 308 uses its convolutional network and the initial image at 304 to distinguish between the posterior distribution simulated images at 312 and the deemed true image 314 for training a statistical learning model for use by the convolutional network of the Generator 306 in then later generating posterior distribution simulated images at 312 at run-time (e.g., after training) such as for determining an image error or uncertainty associated with a subsequently obtained at least one reconstructed initial image at 304. During training, since both the Discriminator 308 and the Generator 306 have access to the initial image at 304 (e.g., the mean image), the CGAN training can be seen as conditioning on the image data 300. The deemed true image 314 can also be an image of the same object, that is, corresponding to the initial image 304 of the object, but with the deemed true image 314 obtained with a higher degree of accuracy (less uncertainty), such as by using more radiation, for example, in a CT imaging modality example.

Figure 4:
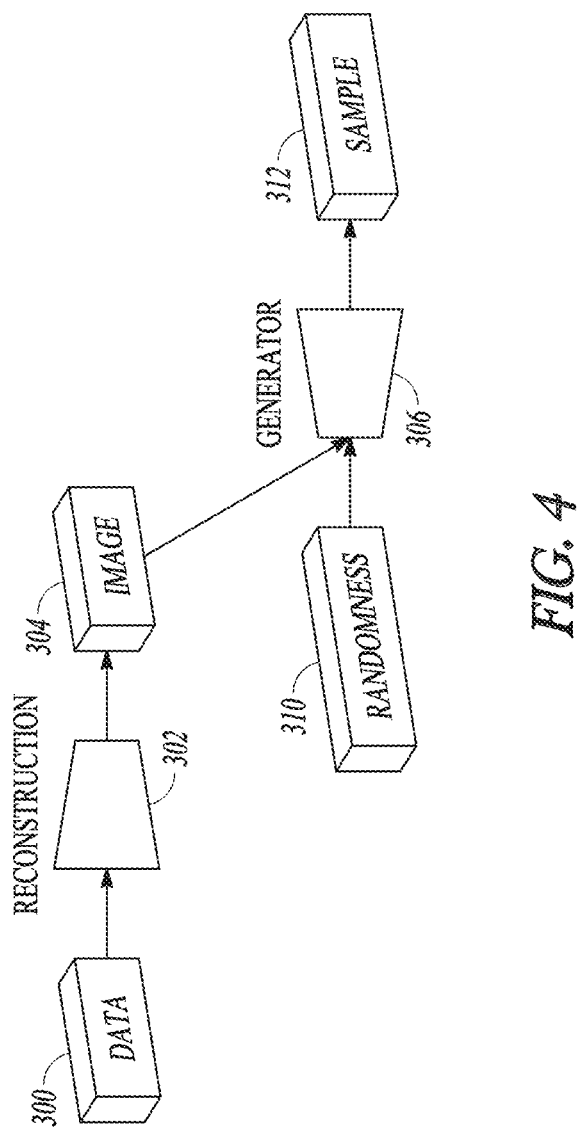
FIG. 4 illustrates the particular aspects of FIG. 3 that can be used, at run-time, to provide uncertainty or error information about a reconstructed image using the previously trained Generator.

FIG. 4 illustrates the particular aspects of FIG. 3 that can be used, at run-time, to provide uncertainty or error information about a reconstructed image using the previously trained Generator 306, with such training of the Generator 306 carried out such as described above with respect to FIG. 6. In the example of FIG. 4, the Discriminator 308 need not be used at run-time. At run-time, a statistical learning, MAP estimator, or other reconstruction at 302 can be used to produce a mean image 304 from previously-acquired image data. Uncertainty information about the mean image can be provided by the previously-trained Generator 306, operating on the mean image at 304 in combination with random noise values at 310 to generate posterior distribution simulated images at 312, which can provide uncertainty information associated with the mean image 304, such as explained further herein.

Figure 5D:
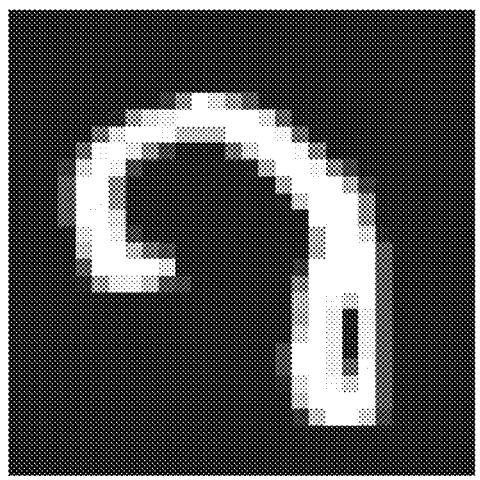
Figure 5D:
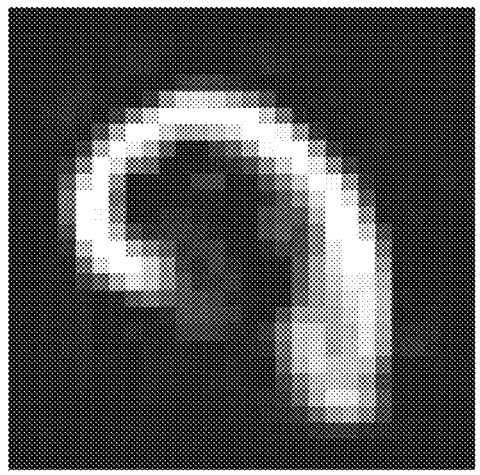
Figure 5D:
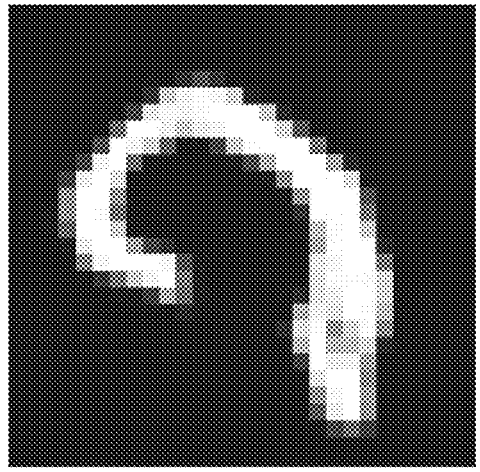
Figure 5D:
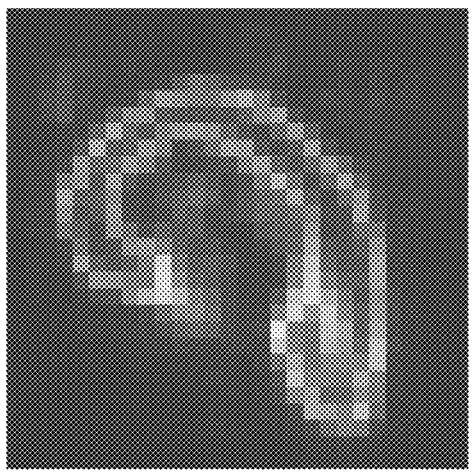

FIGS. 5A, 5B, 5C, and 5D illustrate examples of how the posterior distribution simulated images at 312 can be used to assess uncertainty information associated with the mean image 304. FIG. 5A shows an example of a deemed true image 314 of an example of an object. FIG. 5B shows an example of a corresponding mean reconstructed image 304, such as can be obtained by applying a statistical learning reconstruction technique, a MAP estimator reconstruction technique, or another reconstruction technique to acquired imaging data 300 of the object. FIG. 5C shows an example of one of several posterior distribution simulated images at 312, such as generated as described herein using the Generator 306 with the mean reconstructed image 304 and the random noise values at 310 as inputs to the Generator 306. Each of the posterior distribution simulated images at 312 provides an alternative representation of the mean reconstruction image 304 shown in FIG. 5B, taking into account a degree of uncertainty associated with the introduction of the random noise values at 310 that were provided as inputs to the Generator 306. For example, by stepping through ones of the posterior distribution simulated images at 312 (an example of one of which is shown in FIG. 5C), a visual representation of the uncertainty associated with the mean reconstructed image 304 can help guide interpretation of the mean reconstructed image 304. For example, if the dark spot within the interior of the deemed true image 314 in FIG. 5A represents a tumor within an object such as a human subject, the various posterior distribution simulated images 312 in FIG. 5C can provide alternative representations accounting for noise-induced uncertainties. This can allow the user to better visually interpret the mean reconstruction image 304 shown in FIG. 5B, such as to assess whether there is a tumor fully enclosed within the interior of the image (such as shown in the true image 314 of FIG. 5A), when the mean reconstruction image 304 such as shown in FIG. 5B is unclear or ambiguous with respect to whether such a feature exists. The collection of posterior distribution simulated images 312 may provide at some samples 312 within the uncertainty distribution that may more clearly hint at the existence of such a feature, even with the ambiguity in the mean reconstruction image 304 shown in FIG. 5B.

Thus, using the trained architecture shown in FIG. 4 at run-time, it is possible to quickly generate samples from the posterior distribution P(x|y), such as to provide posterior distribution simulated images 312. Such posterior distribution simulated images 312 can enable one to solve various statistical decision problems associated with the image reconstruction problem, such as can permit using Bayesian hypothesis tests to test for the visibility of a tumor, or to compute a point-wise error from the various posterior distribution simulated images 312, such as can be depicted in a colored or grayscale or other shaded composite image (e.g., a "heat map"), such as depicted in FIG. 5D for 1000 posterior distribution simulated images 312 shown in FIG. 5C. Performing computations such as shown in FIG. 5D would not be computationally feasible using a method such as a Markov Chain Monte Carlo (MCMC) technique.

Display of uncertainty information can include using a variety of techniques. For example, the numerous posterior distribution sampled images 312 can be displayed in temporal succession, such as in a video display. Such a video can allow spatiotemporal evaluation of a candidate feature, such as can include determining a spatiotemporal presence of the candidate feature in, across, or between the various image frames of the video. Such spatiotemporal evaluation can include viewing or otherwise using information about how often a candidate feature is present in the video, whether a spatiotemporal position of the candidate feature is moving in the video images or is disappearing and reappearing spatiotemporally in the video, or the like. Such techniques can help provide valuable insight as to the nature of one or more features associated with the mean reconstructed image such as shown in FIG. 5B.

Further, the uncertainty information can be used to modify the mean reconstructed image 304 such as shown in FIG. 5B. Since the mean reconstructed image 304 often represents a smoothed image (to account for noise), its display may be missing relevant "texture" that would be meaningful to a user, but that was smoothed out by the reconstruction technique used to generate the mean reconstructed image 304 in FIG. 5B. The uncertainty information can be processed to generate and display a visual texture that is based on an indicator of the degree of uncertainty, such as within one or more regions of the reconstructed image, and the reconstructed image can be modified accordingly and presented as an appropriately textured image for display to a user.

The pointwise error composite image shown in FIG. 5D is merely one example of a way to convey uncertainty information associated with a mean reconstructed image 304 as shown in FIG. 5B. For example, instead of displaying the uncertainty information such as shown in FIG. 5C or 5D, the uncertainty information can be provided to another component of the image processor circuitry or other circuitry for further post-processing. For example, such post-processing can include computing an aggregate error index over all or a specified portion of the image. In an example, such post-processing can include estimating a probability of existence of a particular feature, such as using information about the spatiotemporal presence of the particular feature across some or all of the posterior distribution sampled images 312. Some other illustrative non-limiting examples of further post-processing that can make use of such uncertainty information can include, for example, segmentation or other point-wise (e.g., pixel-wise or voxel-wise) or other classification, radiation dose-computation, or the like. For example, radiation dose computation can use density information from a reconstructed image the available of pointwise or other uncertainty information can be used along with the mean density information in the radiation dose-computation, such as can help provide more accurately tailored radiation dose to a tumor or other desired delivery region within a subject while helping better avoid delivering unwanted radiation to one or more organs at risk (OARs).

Although the above description has emphasized a use case of the present posterior distribution sampling technique for exploring uncertainty with a mean reconstructed image use case, the techniques described herein can also be used where segmentation is performed at 302 upon reconstructed image data at 300 to produce a mean segmented image at 304, rather than where reconstruction is performed at 302 upon acquired imaging data 300 to produce a mean reconstructed image at 304, such as described and explained above. In the segmentation use-case, the true image 314 is a deemed true segmented image. For example, the deemed true segmented image can be an image that has been segmented by one or more human experts (e.g., by one or several radiologists or other medical doctors, possibly with access to further information beyond the reconstructed or other image data (e.g., biopsy information, information from one or more other imaging modalities, or other further information), or that has been segmented by one or more already trained machines, possibly with access to further information.

As mentioned above, the present techniques can be implemented using a generative model that can be conditioned on some input, e.g., using a Conditional Variational Auto-Encoder (CVAE) or a Conditional Generative Adversarial Network (CGAN). For illustrative clarity, the explanation given below in the Detailed. Description of this patent document emphasizes a CGAN approach, however, the present techniques are not so limited. For example, aspects of the present techniques can be employed using a Conditional Variational Auto-Encoder (CVAE) or a Conditional Generative Adversarial Network (CGAN) instead of a CGAN. Further, aspects of the present techniques can be used in a system employing a GAN, VAE, or other machine learning technique, without requiring a model that is conditioned upon some input, as would be the case with the CGAN implementation emphasized herein.

Deep Direct Estimation Approach

The above-described Deep Posterior Sampling approach for quantifying uncertainty in image reconstruction can use generative models from machine learning to create random samples $s_i$ from the probability distribution given by P(x=x|y=y). Using such generated random samples, a wide range of one or more estimators can be evaluated. For example, according to the law of large numbers, the posterior mean can be approximated according to $$\mathbb{E}[x \mid y = y] \approx \frac{1}{n}\sum_{i=1}^{n} s_i$$

Likewise, the posterior (pointwise) variance is given by $$\mathbb{E}[(x - \mathbb{E}[x \mid y = y])^2 \mid y = y] \approx \frac{1}{n}\sum_{j=1}^{n}\left(s_j - \frac{1}{r}\sum_{i=1}^{r} s_i\right)^2$$

Such samples can also be used to answer one or more questions, such as, for example, "what is the probability of there being a tumor at a particular location?" by checking how commonly the tumor is present in the various generated samples.

The present inventors have recognized, among other things, that classical (MAP) estimators only reconstruct a single image, which implies an enormous loss of important information. As an example, all of the information contained in the posterior distribution P(x=x|y=y) related to quantifying the uncertainty associated with the reconstruction (estimator) is lost. The same problem applies to "classical" machine learning approaches that only give an approximation of the conditional mean.

While the above-described Deep Posterior Sampling approach can solve problems such as these elegantly and in a computationally feasible manner, the computational runtime can still be non-negligible. For example, generating each sample $s_i$ can take about 10 milliseconds per slice, e.g., using hardware currently available in 2018. To accurately compute an estimator, hundreds of samples can be needed, which can translate to run-times on the order of seconds per slice, or minutes for a 3D volume.

Alternatively or additionally, a deep direct estimation approach can include using one or more machine learning approaches to directly compute one or more predetermined estimators, such as of the form described below, such as without requiring any sampling. For example, consider any estimator of the form $$\mathbb{E}[f(x,y)|y=y]$$

In the above, $f: X \times Y \to Z$ is an arbitrary function. For example, a conditional mean can be obtained using $f(x, y)=x$ and the conditional (pointwise) variance by using $f(x, y)=(x-\mathbb{E}[x|y=y])^2$.

In a practical example, the probability distribution of data may not be known. Instead, access to training data $(x_i, y_i)$ is only available from the joint distribution $P(x=x, y=y)$. Hence, computing the conditional expectation in the above is impossible, since we don't have sufficient training data from the conditional distribution $P(x=x|y=y)$. This means that we cannot compute the above type of estimators directly.

To solve this problem, the present inventors have recognized the following statement, which can be proven.

$$\mathbb{E}[f(x,y)|y=\cdot]=\arg\min_{R:Y\to X}\mathbb{E}\|R(y)-f(x,y)\|_Z^2$$

Note that in the above statement, to the left there exists a conditional expectation, while on the right we simply have the standard expectation. Thus, our training data does not allow directly approximation of the left-hand side, but such training data can be used to evaluate the right-hand side.

The present inventors have recognized that, among other things, this means that any estimator that can be written as a conditional estimator can be characterized as the function that can be used to solve an optimization problem over the joint distribution. While the usefulness of this by itself may be limited, the function $R: Y \to X$ can be replaced with a parametrized function $R_\theta$ where $\theta$ can represent the parameters. Specifically of interest are neural networks, such as in which $\theta$ will include the parameters (weights, biases, etc.) of the network. Further, the expected value to the right can be replaced with our training data. Thus, it can be shown that solving the learning problem, $$\theta^* = \arg\min_\theta \frac{1}{n}\sum_{i=1}^{n}\|R_\theta(y_i) - f(x_i, y_i)\|_Z^2$$

which is to find the best weights for our training data, yields a direct estimator $$R_{\theta^*}(y) \approx \mathbb{E}[f(x,y)|y=y]$$

To put this is less mathematical terms, it can often be desired to compute one or more estimators that can be given as a conditional expectation of some function. Such estimators can be very useful in certain applications, e.g., the conditional mean and variance are of high interest. It is also possible to compute even more intricate estimators, such as the average bone density, the outline (e.g., segmentation) of a tumour, or the like. Doing so directly may not be feasible, such as where there is not enough training data to compute the conditional expectation. Instead, the present inventors have recognized that it is possible to re-write the estimator as the minimizer of an optimization problem with a very specific choice of objective function. This optimization problem is of the same type as is typically found in deep learning applications. Thus, it can be well-solved using a deep learning approach.

After training (which can be done off-line) we can obtain a function $R_\theta: Y \to Z$ that is given by a neural network. To evaluate the estimator, we only need to evaluate this neural network once. This is very fast, taking only ≈10 milliseconds per slice, or seconds for a 3D volume.

The method as given above is general, e.g., it can be applied to a very wide range of settings, including tomographic imaging, but also to other things, such as image segmentation, radiation dose computation, etc.

Illustrative Numbered Examples of Deep Direct Estimation

Example 1. (Training) A method of training a neural network for processing imaging or other spatially distributed data using processor circuitry applying a statistical learning model, the method comprising: obtaining imaging or other spatially distributed training data; selecting an estimator of interest that is capable of being represented as a conditional expectation, the estimator of interest capable of being represented in a parameterized form by a trained neural network; training the neural network by solving an optimization problem over a joint distribution, wherein the optimization problem has the estimator of interest as a minimizer.

Example 2. (Runtime) A method of processing imaging or other spatially distributed data using processor circuitry applying a statistical learning model, the method comprising: obtaining imaging or other spatially distributed data corresponding to a patient of interest; using a trained neural network and the imaging or other spatially distributed data for performing at least one of image reconstruction, image segmentation, or radiation dose computation; and providing the results of the at least one of image reconstruction, image segmentation, or radiation dose computation for at least one of displaying or further processing; and wherein the neural network is previously trained according to Example 1.

Example 3. The method of Example 2, comprising using the trained neural network and the imaging or other spatially distributed data for performing uncertainty estimation for at least one of image reconstruction, image segmentation, or radiation dose computation.

FIG. 6 illustrates a block diagram of an embodiment of a device or machine 1000 on which one or more of the methods as discussed herein can be implemented. One or more items of the image processing device 112 can be implemented by the machine 1000. The machine 1000 can operate as a standalone device or may be connected (e.g., networked) to other machines. The image processing device 112 can include one or more of the items of the machine 1000. In a networked deployment, the machine 1000 may operate in the capacity of a server or a client machine in server-client network environment, or as a peer machine in a peer-to-peer (or distributed) network environment. The machine may be a personal computer (PC), a tablet PC, a set-top box (SIB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 1000 can include processing circuitry 1002 (e.g., a central processing unit (CPU), a graphics processing unit (GPU), an application specific integrated circuit, circuitry, such as one or more transistors, resistors, capacitors, inductors, diodes, logic gates, multiplexers, buffers, modulators, demodulators, radios (e.g., transmit or receive radios or transceivers), sensors 1021 (e.g., a transducer that converts one form of energy (e.g., light, heat, electrical, mechanical, or other energy) to another form of energy), or the like, or a combination thereof), a main memory 1004 and a static memory 1006, which communicate with each other via a bus 1008. A datum or data associated with the described methods can be stored in or retrieved from such memory, and initialized or updated as desired to carry out the methods described herein. The machine 1000 (e.g., computer system) may further include a video display unit 1010 (e.g., a liquid crystal display (LCD) or a cathode ray tube (CRT)). The machine 1000 can also include an alphanumeric input device 1012 (e.g., a keyboard), a user interface (UI) navigation device 1014 (e.g., a mouse), a disk drive or mass storage unit 1016, a signal generation device 1018 (e.g., a speaker) and a network interface device 1020.

The disk drive unit 1016 can include a machine-readable medium 1022 on which is stored one or more sets of instructions and data structures (e.g., software) 1024 embodying or utilized by any one or more of the methodologies or functions described herein. The instructions 1024 may also reside, completely or at least partially, within the main memory 1004 and/or within the processor 1002 during execution thereof by the machine 1000, the main memory 1004 and the processor 1002 also constituting machine-readable media.

The machine 1000 as illustrated can include an output controller 1028. The output controller 1028 manages data flow to/from the machine 1000. The output controller 1028 can sometimes be called a device controller, with software that directly interacts with the output controller 1028 being called a device driver.

While the machine-readable medium 1022 is shown in an embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

As used herein, "communicatively coupled between" means that the entities on either of the coupling must communicate through an item therebetween and that those entities cannot communicate with each other without communicating through the item.

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A computing system, comprising:
   memory circuitry to store medical imaging data of a human subject acquired at least in part using a medical imaging modality; and
   processor circuitry configured to:
      provide at least one initial image and an image randomness component to a generator neural network, the initial image including an anatomical representation of the human subject that is based on the medical imaging data acquired from the human subject, and the generator neural network configured to apply a previously trained conditional generative statistical learning model;
      generate, with the generator neural network, a plurality of posterior distribution simulated images from the initial image and the image randomness component, the plurality of posterior distribution simulated images providing respective simulated anatomical representations of the human subject;
      analyze the posterior distribution simulated images, to identify at least one indication of an image error associated with the initial image; and
      provide the indication of the image error associated with the initial image.

2. The computing system of claim 1, the processor circuitry further configured to apply a reconstruction to the medical imaging data to generate the at least one initial image.

3. The computing system of claim 1, the processor circuitry further configured to apply a segmentation to the medical imaging data to generate the at least one initial image.

4. The computing system of claim 1, the processor circuitry further configured to evaluate a feature at least in part using the posterior distribution simulated images.

5. The computing system of claim 4, wherein operations to evaluate the feature include a determination of at least one of:
   a count of the feature in the posterior distribution simulated images;
   a spatiotemporal presence of the feature in the posterior distribution simulated images; or
   a change in spatiotemporal position of the feature among the posterior distribution simulated images.

6. The computing system of claim 1, the processor circuitry further configured to modify the initial image using the indication of the image error for display to a user.

7. The computing system of claim 6, wherein the initial image includes a mean reconstruction image, and wherein operations to modify the initial image includes adding a variation to texture at least one region of the mean reconstruction image.

8. The computing system of claim 1, wherein operations to provide the indication of the image error associated with the initial image includes operations to perform at least one of:
   output an aggregate error index corresponding to all or a specified portion of the initial image;
   output an estimation of a probability of existence of a particular feature in the initial image;
   output a point-wise indication of the image error associated with the initial image;
   output the posterior distribution simulated images as frames in a video; or
   output a composite error image determined from the posterior distribution simulated images.

9. The computing system of claim 1, wherein operations to provide the indication of the image error includes operations to cause an MR-LINAC workstation to present a display of the image error for use in radiation treatment planning or administration.

10. The computing system of claim 1, the processor circuitry further configured to update, or receive an update, of a radiation treatment protocol based at least in part upon the indication of the image error.

11. The computing system of claim 1, wherein the generator neural network implements a first convolutional neural network produced from a conditional generative adversarial network configuration, the conditional generative adversarial network configuration including a discriminator neural network that implements a second convolutional neural network.

12. The computing system of claim 1, wherein the generator neural network implements a variational auto-encoder.

13. The computing system of claim 12, wherein the variational auto-encoder is a conditional variational auto-encoder.

14. A computing system, comprising:
   memory circuitry to store medical imaging data of at least one image of an anatomical object captured from a human subject; and
   processor circuitry configured to:
      obtain at least an initial image for use with an adversarial network comprising a discriminator neural network and a generator neural network, the initial image including an anatomical representation that is based on the medical imaging data captured from the human subject;
      provide at least one corresponding deemed true image of the anatomical object to the discriminator neural network;
      use the generator neural network to generate, from the initial image and an image randomness component, posterior distribution simulated images, the posterior distribution simulated images conditioned on the initial image provided to the discriminator neural network; and
      use the discriminator neural network and the initial image to distinguish between the posterior distribution simulated images and the deemed true image, causing training of a statistical learning model, the statistical learning model adapted to be implemented by the generator neural network in operations to generate posterior distribution simulated images, the posterior distribution simulated images providing respective simulated anatomical representations of a new human subject;
      wherein analysis of the posterior distribution simulated images generated from a subsequently obtained image of the new human subject enables identification of an image error associated with the subsequently obtained image.

15. The computing system of claim 14, the processor circuitry further configured to train the discriminator neural network using the posterior distribution simulated images and the deemed true image.

16. The computing system of claim 15, the processor circuitry further configured to train at least the discriminator neural network using a conditional generative adversarial network arrangement.

17. A non-transitory computer-readable storage medium comprising instructions stored thereon, wherein the instructions when executed by a computing system, cause the computing system to apply a trained statistical learning model with operations comprising:
   providing at least one initial image and an image randomness component to a generator neural network, the initial image including an anatomical representation of a human subject that is based on medical imaging data of the human subject acquired at least in part using a medical imaging modality, and the generator neural network configured to apply a previously trained conditional generative statistical learning model;
   generating, with the generator neural network, a plurality of posterior distribution simulated images from the initial image and the image randomness component, the plurality of posterior distribution simulated images providing respective simulated anatomical representations of the human subject;
   analyzing the posterior distribution simulated images, to identify at least one indication of an image error associated with the initial image; and
   providing the indication of the image error associated with the initial image.

18. The computer-readable storage medium of claim 17, further comprising instructions to cause operations comprising:
   applying a reconstruction to the medical imaging data to generate the at least one initial image.

19. The computer-readable storage medium of claim 17, further comprising instructions to cause operations comprising:
   applying a segmentation to the medical imaging data to generate the at least one initial image.

20. The computer-readable storage medium of claim 17, further comprising instructions to cause operations comprising:
   evaluating at least one feature using the posterior distribution simulated images.

21. The computer-readable storage medium of claim 17, wherein the generator neural network implements a first convolutional neural network produced from a conditional generative adversarial network configuration, the conditional generative adversarial network configuration including a discriminator neural network that implements a second convolutional neural network.

22. The computer-readable storage medium of claim 17, wherein the generator neural network implements a variational auto-encoder.

23. A non-transitory computer-readable storage medium comprising instructions stored thereon, wherein the instructions, when executed by a computing system, cause the computing system to train a statistical learning model with operations comprising:
   obtaining at least an initial image for use with an adversarial network comprising a discriminator neural network and a generator neural network, the initial image including an anatomical representation that is based on medical imaging data of an anatomical object captured from a human subject;
   providing at least one corresponding deemed true image of the anatomical object to the discriminator neural network;
   using the generator neural network to generate, from the initial image and an image randomness component, posterior distribution simulated images, the posterior distribution simulated images conditioned on the initial image provided to the discriminator neural network; and
   using the discriminator neural network and the initial image to distinguish between the posterior distribution simulated images and the deemed true image, causing training of a statistical learning model, the statistical learning model adapted to be implemented by the generator neural network in operations to generate posterior distribution simulated images, the posterior distribution simulated images providing respective simulated anatomical representations of a new human subject;

wherein analysis of the posterior distribution simulated images generated from a subsequently obtained image of the new human subject enables identification of an image error associated with the subsequently obtained image.

24. The computer-readable storage medium of claim 23, the operations further comprising training the discriminator neural network using the posterior distribution simulated images and the deemed true image.

25. The computer-readable storage medium of claim 24, the operations further comprising training the discriminator neural network using a conditional generative adversarial network (GAN) arrangement.

* * * * *